(12) United States Patent
Madsen et al.

(10) Patent No.: US 10,408,381 B2
(45) Date of Patent: Sep. 10, 2019

(54) LUBRICANT CONTAINER

(71) Applicant: Siemens Aktiengesellschaft, München (DE)

(72) Inventors: Jacob Djernes Madsen, Karup J. (DK); Kenneth Stoltenberg Larsen, Brande (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 191 days.

(21) Appl. No.: 15/652,608

(22) Filed: Jul. 18, 2017

(65) Prior Publication Data
US 2018/0106426 A1 Apr. 19, 2018

(30) Foreign Application Priority Data
Oct. 18, 2016 (DE) .................... 10 2016 220 407

(51) Int. Cl.
*B65D 41/04* (2006.01)
*B65D 41/16* (2006.01)
(Continued)

(52) U.S. Cl.
CPC .......... *F16N 11/08* (2013.01); *B65D 41/0471* (2013.01); *B65D 41/16* (2013.01);
(Continued)

(58) Field of Classification Search
CPC . F16N 7/14; F16N 11/08; F16N 19/00; B65D 41/10; B65D 41/16; B65D 41/40;
(Continued)

(56) References Cited

U.S. PATENT DOCUMENTS 612,075 A * 10/1898 Webendorfer .......... F16N 11/08
  184/61
822,895 A * 6/1906 Kindig ................... B65D 41/16
  215/321

(Continued)

FOREIGN PATENT DOCUMENTS

DE    8700973 U1    3/1987
DE    4242938 A1    6/1994
(Continued)

OTHER PUBLICATIONS

Chinese Office Action (dated Dec. 24, 2018) for Chinese Application No. 201710970867.3—Filing Date Oct. 18, 2017.
(Continued)

*Primary Examiner* — Minh Truong
(74) *Attorney, Agent, or Firm* — Schmeiser, Olsen & Watts LLP

(57) ABSTRACT

A container for collecting a lubricant including a housing having a longitudinal axial extension between a first end connectable to a source of lubricant and a longitudinally opposite second end, a cap attached to the second end, a piston slidably movable inside the housing between the first end and the second end of the housing. The cap is attached to the second end of the housing by a snap connection for blocking the axial translation between cap and the housing, the cap and the housing having respectively a first flat surface and a second flat surface contacting each other for preventing rotation of the cap around a longitudinal axis of the housing.

7 Claims, 6 Drawing Sheets

(51) Int. Cl.
  *B65D 43/02* (2006.01)
  *B65D 83/00* (2006.01)
  *F16N 11/08* (2006.01)
  *F16N 19/00* (2006.01)
  *F16N 31/00* (2006.01)

(52) U.S. Cl.
  CPC ..... *B65D 43/0212* (2013.01); *B65D 83/0005* (2013.01); *F16N 19/00* (2013.01); *F16N 31/004* (2013.01)

(58) Field of Classification Search
  CPC ............ B65D 41/0471; B65D 43/0212; B65D 50/061
  See application file for complete search history.

(56) References Cited

U.S. PATENT DOCUMENTS

| | | | | |
|---|---|---|---|---|
| 1,333,245 | A * | 3/1920 | Carson | B65D 1/0246 215/295 |
| 1,373,437 | A | 4/1921 | Lugheed | |
| 1,562,073 | A * | 11/1925 | Batchelor | B65D 41/0471 215/329 |
| 4,735,288 | A * | 4/1988 | Uematsu | F16N 7/34 184/55.1 |
| 4,832,220 | A * | 5/1989 | Quennessen | B65D 41/0471 215/331 |
| 5,050,762 | A * | 9/1991 | Giorgi | B65D 43/0212 220/281 |
| 5,579,933 | A * | 12/1996 | Hofmann | B65D 47/283 206/536 |
| 7,731,050 | B2 * | 6/2010 | Parks | B65D 21/0219 206/509 |
| 2004/0245204 | A1 * | 12/2004 | Suffa | B65D 41/0471 215/224 |
| 2006/0255041 | A1 | 11/2006 | Zell | |
| 2008/0230318 | A1 | 9/2008 | Eisenbacher | |
| 2009/0038888 | A1 | 2/2009 | Eisenbacher | |
| 2009/0133962 | A1 | 5/2009 | Orlitzky et al. | |
| 2011/0219735 | A1 | 9/2011 | Li | |
| 2011/0315485 | A1 | 12/2011 | Morper | |
| 2012/0103465 | A1 | 5/2012 | Paluncic | |
| 2012/0248129 | A1 * | 10/2012 | Yoshida | B65D 41/16 220/780 |
| 2013/0206511 | A1 * | 8/2013 | Hildenbrand | F16N 11/08 184/26 |
| 2013/0233854 | A1 * | 9/2013 | Smyers | B65D 53/00 220/240 |
| 2015/0225134 | A1 * | 8/2015 | Kato | B65D 41/0471 220/214 |
| 2015/0321800 | A1 * | 11/2015 | Viale | B65D 47/06 215/43 |

FOREIGN PATENT DOCUMENTS

| | | |
|---|---|---|
| DE | 202006017522 U1 | 1/2007 |
| DE | 102008017098 A1 | 10/2009 |
| EP | 1756467 A1 | 2/2007 |
| EP | 2025990 A1 | 2/2009 |
| EP | 2447485 A1 | 5/2012 |
| EP | 2573444 A1 | 3/2013 |
| EP | 2573444 B1 | 3/2013 |
| WO | WO 2005000700 A1 | 1/2005 |

OTHER PUBLICATIONS

Amazon DE: "Lunchbox groß silber München" : Internet, Jan. 22, 2014.—ISBN—. https://www.amazon.de/K%C3%BCchenprofi-1001472423-Lunch-gro%C3%9F-silber/dp/B00C8SOKSE [abgerufen am Apr. 8, 2017]. [Internet].

European Search Report for EP Application No. 17180866.0, dated Mar. 14, 2018.

* cited by examiner

LUBRICANT CONTAINER

CROSS-REFERENCE TO RELATED APPLICATIONS

This application claims priority to German application No. DE 102016220407.6, having a filing date of Oct. 18, 2016, the entire contents of which are hereby incorporated by reference.

FIELD OF TECHNOLOGY

The following relates to a lubricant container. More particularly, but not exclusively, embodiments of this invention concern a lubricant container connected to a lubricated device to collect excess lubricant.

BACKGROUND

A container of the above type comprises a cylindrical housing having a first axial end formed with an intake opening connected to a source of lubricant. The first axial end of the cylindrical housing is provided with an external thread for connecting with the source of lubricant. Particularly, but not exclusively, the source of lubricant may be a bearing.

Such a container typically comprises a piston slidably mounted inside the housing, which divides the container into a front compartment into which the intake opening opens and a back compartment that is delimited by a second axial end of the cylindrical housing. The piston can thus be moved back as the compartment fills until it reaches the second axial end of the container preventing further movement. The second axial end is covered with a cap having a vent hole. The second axial end and the cap are typically joined together through a threaded coupling.

A lubricant container of the above type is described in the patent document EP 2573444.

A lubricant container of the above type can be improved in many aspects. In particular:
  the coupling between the second axial end of the container and the cap can be improved by making it easier the assembling and more difficult the disassembly,
  the coupling between the second axial end of the housing and the cap requires threads to be provided both on the second axial end of the container and on the cap, i.e. further manufacturing steps are necessary after the manufacturing of the cylindrical housing and of the cap, which are both normally obtained by a moulding process,
  in the container of the above described type, at service, an operator is not able to empty the container, particularly when the container is full of lubricant, i.e. when the piston reaches the second axial end,
  the threaded coupling between the first axial end of the cylindrical housing and the source of lubricant does not allow an easy mounting or substitution of the lubricant container, particularly when the operator cannot visually see the mounting position,
  further, the threaded coupling between first axial end of the cylindrical housing and the source of lubricant does not provide an efficient sealing.

SUMMARY

An aspect relates to providing a lubricant container solving the above described inconveniences experimented in known lubricant containers.

According to a first aspect of embodiments of the present invention, a container for collecting a lubricant, the container comprising:
  a housing having a longitudinal axial extension between a first end connectable to a source of lubricant and a longitudinally opposite second end,
  a cap attached to the second end,
  a piston slidably movable inside the housing between the first end and the second end of the housing.

The cap is attached to the second end of the housing by means of a snap connection for blocking the axial translation between the cap and the housing, the cap and the housing having respectively a first flat surface and a second flat surface contacting each other for preventing rotation of the cap around a longitudinal axis of the housing.

The coupling provided between the cap and the housing permit to avoid using threaded coupling between them. Advantageously, this saves a manufacturing step, i.e. the threaded of the cap and of the first axial end of the housing. In particular, the snap connection and the flat surfaces can be directly provided on the cap and on the housing during the respective manufacturing process, for example during the respective moulding processes.

According to possible embodiments of the present invention, the cap has a polygonal border, said snap connection and said first flat surface being provided on at least a face of the polygonal border.

In particular, the cap may comprise a plurality of snap connections and a plurality of first flat surfaces and the polygonal border may comprises a first plurality of faces and a second plurality of faces, the plurality of snap connections and the plurality of first flat surfaces being respectively provided on the first plurality of faces and on the second plurality of faces. More in particular, according to an embodiment of the present invention, the first plurality of faces and the second plurality of faces may be interposed between one another, each face comprising of the first plurality comprising a snap connection and being interposed between two faces of the second plurality of faces.

Advantageously, this provides an efficient coupling between cap and housing thanks to the symmetric distribution of snap connections and flat surfaces around the axis of the container.

According to possible embodiments of the present invention, the cap comprises a vent hole, said vent hole comprising a guide for an external tool, the tool being insertable and guidable in the vent hole for pushing the piston from the first end to the second end of the housing. In particular, the vent hole may be coaxial with the longitudinal axis of the housing.

Advantageously, these embodiments permit the use of hole on the cap with the double function of vent and of guide for pushing the cylinder away from the first end of the housing, i.e. for emptying the container by pushing the lubricant towards the first end of the housing.

According to other possible embodiments of the present invention, the housing comprises a first cylindrical portion where the piston slidably moves and a second conic portion for connecting the first cylindrical portion to the first end, and wherein the container further includes an adapter having:
  a first rigid portion connectable between the first end of the housing and the source of lubricant, and
  a second deformable portion subject to contact the second conic portion of the housing for providing a sealing between the housing and the adapter.

The presence of an adapter and in particular of the second deformable portion permits to minimize the loss of lubricant at the interface between the container and the source of lubricant. Further, the adapter provides an easy and practical guidance to the operator for the mounting of the housing, after the adapter has been connected to the source of lubricant.

In particular, according to a possible embodiment of the present invention, the second deformable portion of the adapter is cylindrical in shape and its deformable between a first configuration in which the second deformable portion does not contact the second conic portion of the housing and a second configuration in which the second deformable portion contact the second conic portion of the housing, the opening angle of the second deformable portion being greater in said second configuration than in said first configuration.

Advantageously, the shape of the second deformable portion permits to achieve an effective sealing between the housing and the adapter.

According to other possible embodiments of the present invention, the piston comprises a circumferential surface having a first deformable circumferential lip extending towards the first end of the housing and a second deformable circumferential lip extending towards the second end of the housing, the first and the second circumferential lip being deformable for providing a sealing between the piston and the housing.

Advantageously, this improves both the sliding and the sealing between the cylinder and housing.

BRIEF DESCRIPTION

Some of the embodiments will be described in detail, with reference to the following figures, wherein like designations denote like members, wherein.

DETAILED DESCRIPTION

Figure 1:
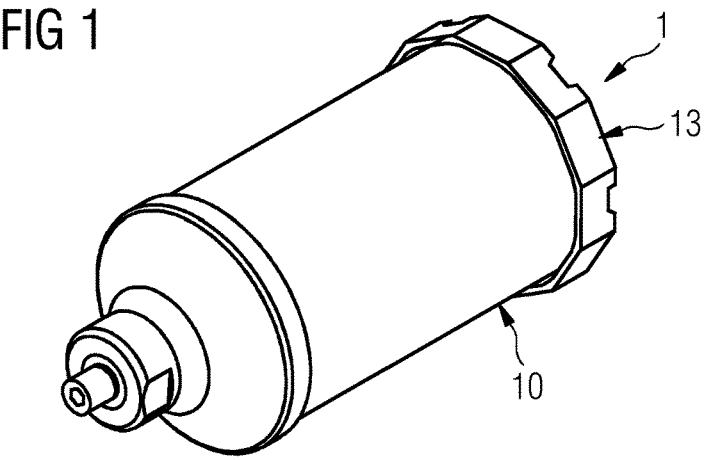
FIG. 1 shows an axonometric view of a lubricant container.
Figure 2:
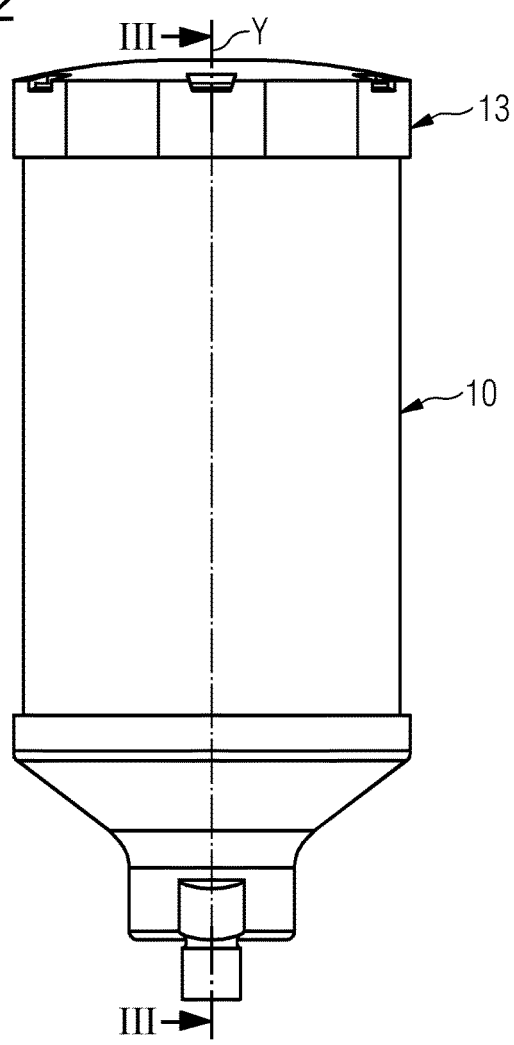
FIG. 2 shows a lateral view of the lubricant container of FIG. 1.
Figure 3:
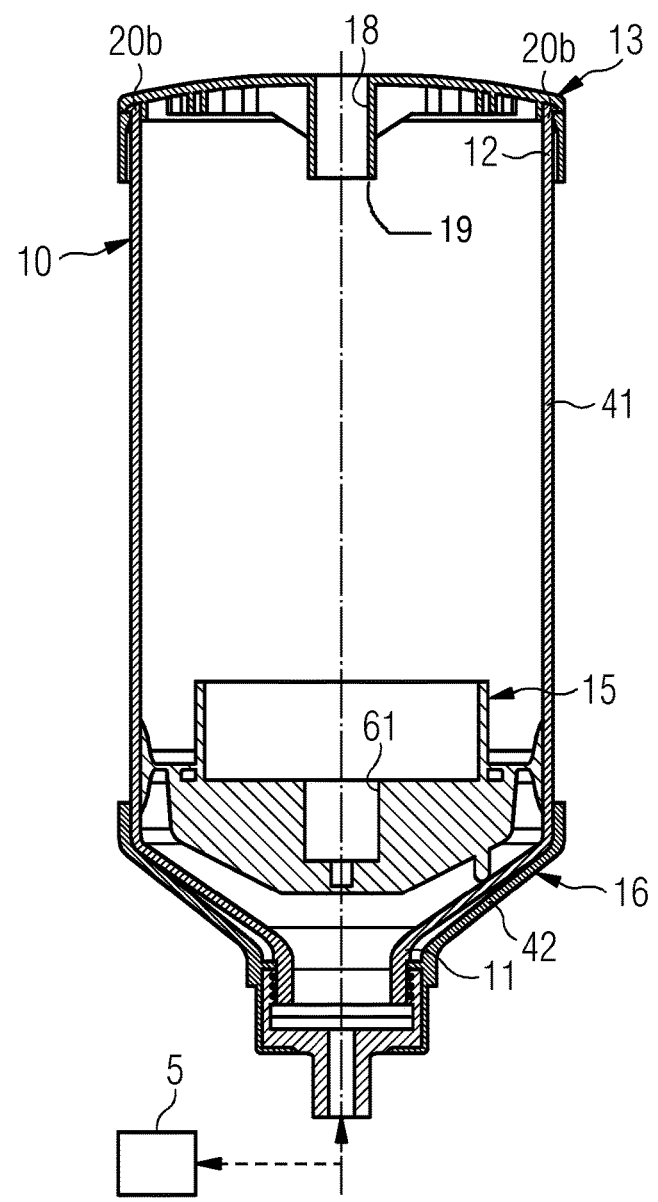
FIG. 3 shows a longitudinal sectional view of the lubricant container of FIG. 1, taken along the section line of FIG. 2.
Figure 4:
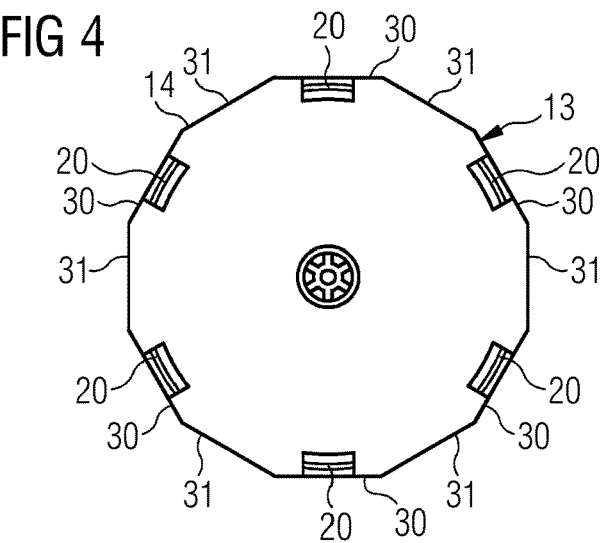
FIG. 4 shows a top view of the lubricant container of FIG. 1.
Figure 5:
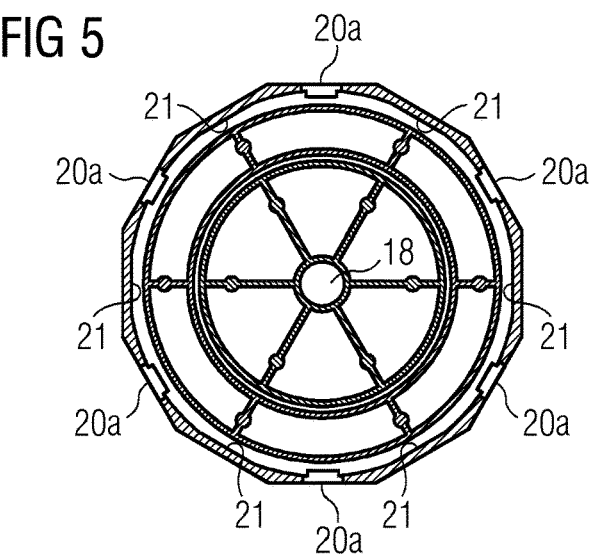
FIG. 5 shows a bottom view of a cap of the lubricant container of FIG. 1.
Figure 6:
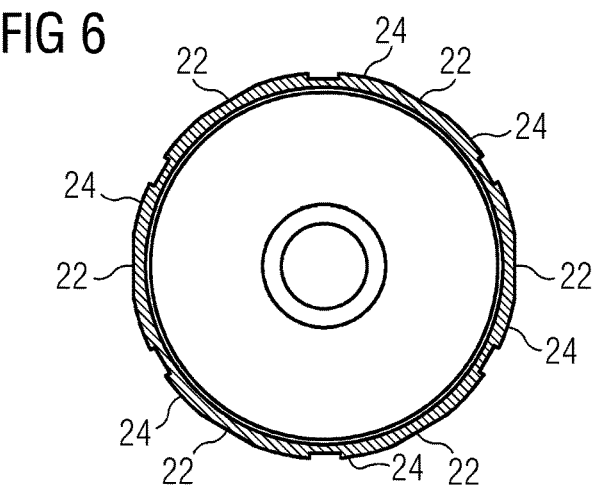
FIG. 6 shows a top view of a housing of the lubricant container of FIG. 1.
Figure 7:
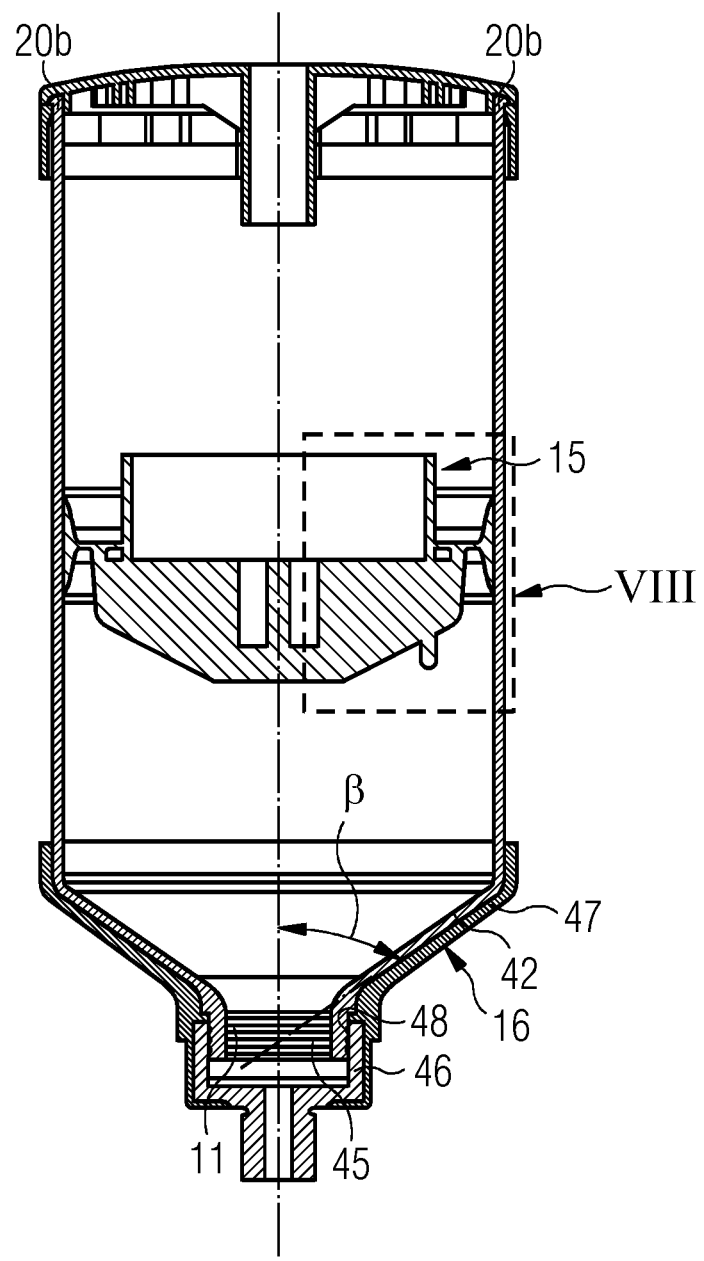
FIG. 7 shows a further longitudinal sectional view of the lubricant container of FIG. 1, with a piston in an intermediate position along the housing of the lubricant container.
Figure 8:
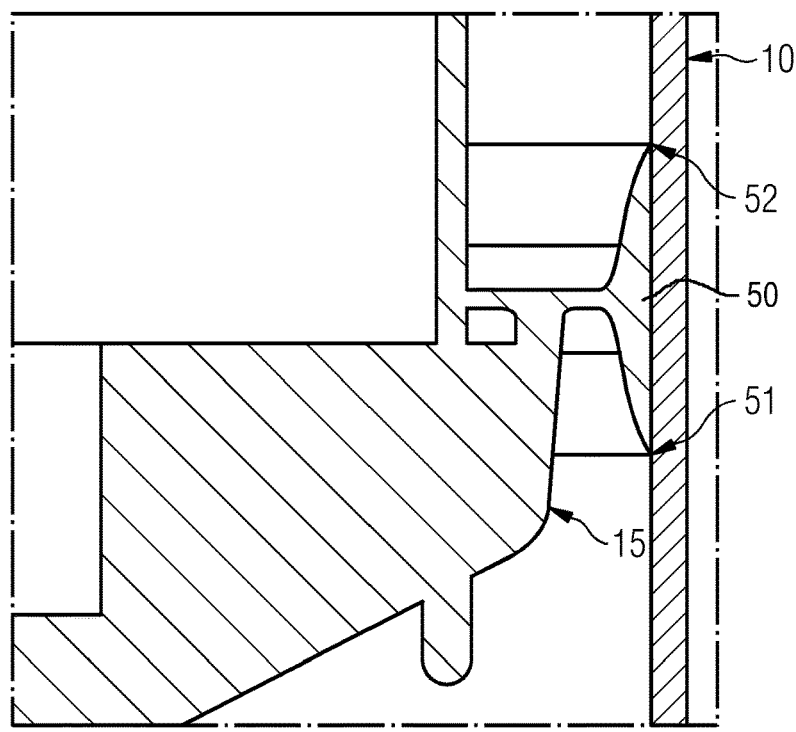
FIG. 8 shows a magnified view of the detail VIII of FIG. 5.
Figure 9:
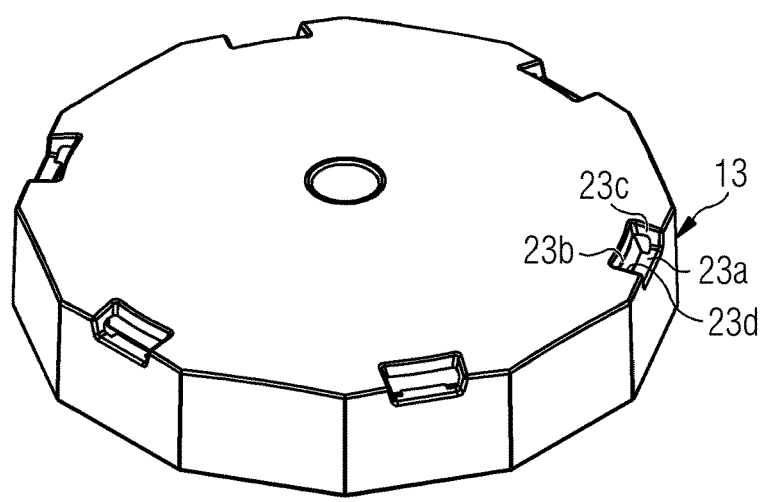
FIG. 9 shows a top axonometric view of a cap for a lubricant container.
Figure 10:
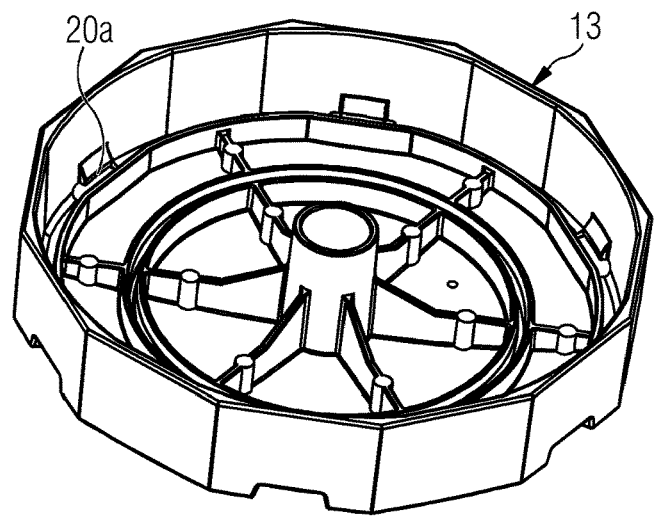
FIG. 10 shows a top axonometric view of the cap of FIG. 9.

The illustrations in the drawings are schematic. It is noted that in different figures, similar or identical elements are provided with the same reference signs.

In the figures, a container 1 for collecting a lubricant comprises:
a housing 10 having a longitudinal axial extension along a longitudinal axis Y. The housing a first between a first longitudinal end 11 connectable to a source of lubricant, schematically represented in FIG. 1 by a block with the reference sign 5, and a longitudinally opposite second end 12,
a cap 13 attached to the second end 12,
a piston 15 slidably movable inside the housing 10 between the first end 11 and the second end 12 of the housing 10,
an adapter 16 having a first rigid portion 46 connectable between the first end 11 of the housing 10 and the source of lubricant 5.

According to a possible embodiment of the present invention, the lubricant is grease and the source of lubricant 5 is a bearing using grease as lubricant.

The cap 13 is attached to the second end 12 of the housing 10 by means of a plurality of snap connections 20 for blocking the axial translation between the cap 13 and the housing 10. The cap 13 and the housing 10 are respectively provided with a plurality of first flat surface 21 and a plurality of second flat surfaces 22 contacting each other for preventing the rotation of the cap 13 around a longitudinal axis Y of the housing 10. The combined action of each snap connection 20 and of the coupling between each first flat surface 21 and the corresponding second flat surfaces 22 fixes the cap 13 to the housing 10.

The plurality of first flat surface 21 and a portion 20a of the snap connection 20 can be directly provided on the cap 13, when the cap 13 is manufactured, for example by injection moulding.

The cap 13 has a polygonal border 14 with a plurality of border walls 30, 31 (twelve border walls 30, 31 in the embodiment of the attached figures). More in particular, the polygonal border 14 comprises a first plurality of border walls 30 (six border walls 30 of the first plurality, in the embodiment of the attached figures) and a second plurality of border walls 31 (six border walls 31 of the second plurality, in the embodiment of the attached figures). The first plurality of border walls 30 and the second plurality of border walls 31 are interposed between one another with respect to the longitudinal axis Y, each border walls 30 of the first plurality being interposed between two border walls 31 of the second plurality and vice versa. Each of the first plurality of border walls 30 comprises a first portion 20a of a respective snap connection 20. The first portion 20a of the snap connection 20 is created on the cap 13, for example through the same manufacturing process of injection moulding used for manufacturing the cap 13, and includes at least four faces 23a, b, c, d for providing four respective blocks (up, down, clockwise rotation and counter clockwise rotation) to the coupling between the cap and the housing 10.

Each of the second plurality of border walls 31 comprises an inner (with respect to the longitudinal axis Y) first flat surface 21, which is subject to contact a respective second flat surface 22 provided on the first end 11 of the housing 10 for preventing both the clockwise and counter clockwise relative rotation of the cap 13 with respect to the housing 10, around the longitudinal axis Y.

The plurality of first flat surfaces 21 are also created on the cap 13, for example through the same manufacturing process of injection moulding used for manufacturing the cap 13.

The housing 10 comprises a first cylindrical portion 41 where the piston 15 slidably moves and which include a free end corresponding to the second end 12 of the housing 10.

The second end 12 of the housing 10 has a shape which permits engaging with the cap 13. To this purpose, the second end 12 has an external polygonal surface with a plurality of surfaces 24, 22 (twelve surfaces 24, 22 in the embodiment of the attached figures). More in particular, the polygonal border of the second end 12 of the housing 10 comprises a first plurality of circular surfaces 24 (six circular surfaces 24, in the embodiment of the attached figures) and a second plurality of flat surfaces 22 (six flat surfaces 22, in the embodiment of the attached figures).

The first plurality of circular surfaces 24 and the second plurality of flat surfaces 22 are interposed between one another around the longitudinal axis Y, each circular surface 24 being interposed between two flat surfaces 22 and vice versa. Each of the circular surfaces 24 comprises a second portion 20b of a respective snap connection 20. The second portion 20b of the snap connection 20 is shaped as a tongue insertable in the first portion of the snap connection 20 for engaging the four faces 23a,b,c,d, thus providing four respective blocks (up, down, clockwise rotation and counter clockwise rotation) to the coupling between the cap and the housing 10.

The coupling between the cap 13 and the housing 10 is obtained by pushing axially, along the longitudinal axis Y, the cap 13 towards the first end of the housing 10, thus bringing into engagement each first portion 20a of the snap connections 20 with a respective second portion 20b of the snap connections 20 a bringing into contact each first flat surface 21 with a respective second flat surface 22.

The housing 10 further comprises a second conic portion 42 interposed between the first cylindrical portion 41 and the first end 11. The first end 11 is cylindrical like the first cylindrical portion 41, but has a smaller diameter than the first cylindrical portion 41. Therefore the second conic portion 42 is required to connect the first cylindrical portion 41 and the first end 11. The first cylindrical portion 41, the second conic portion 42 and the first end 11 have in common the same longitudinal axis Y. The first end 11 is provided with an external thread 45.

The adapter 16 comprises a first rigid portion 46 connectable between the first end 11 of the housing 10 and the source of lubricant 5 and a second deformable portion 47 subject to contact the second conic portion 42 of the housing 10 for providing a sealing between the housing 10 and the adapter 16.

According to a possible embodiment of the present invention, the first rigid portion 46 is made of steel and the second deformable portion 47 is made of plastic material.

The first rigid portion 46 comprises an inner thread 48 for connecting to the external thread 45 of the first end 11 of the housing 10 and an external thread 48 for connecting to the source of lubricant 5, through a threaded duct (not shown in the attached figures).

Figure 11:
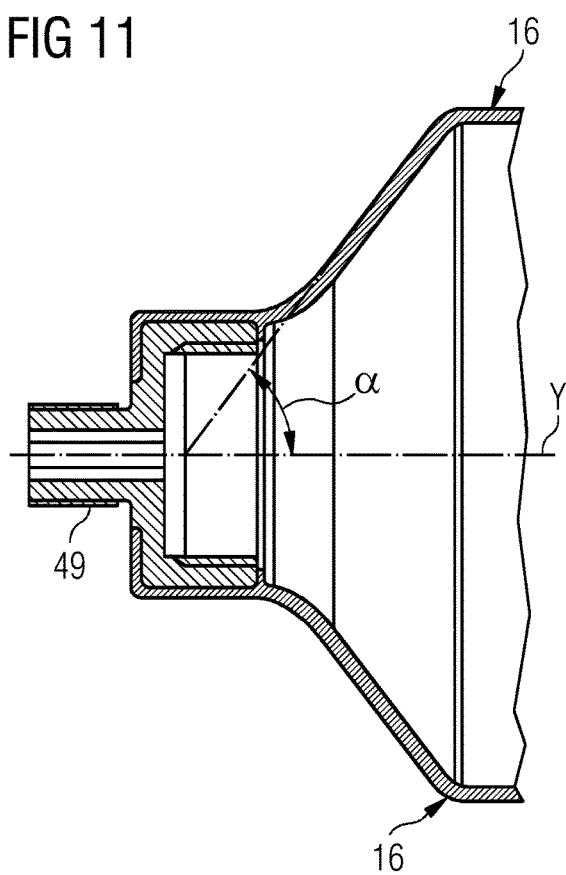
FIG. 11 shows a longitudinal sectional view of an adapter of the lubricant container of FIG. 1.

The second deformable portion 47 of the adapter 16 is conical in shape, thus permitting to receive the second conic portion 42 of the housing 10. The second deformable portion 47 is deformable between a first configuration (shown in FIG. 11) in which the second deformable portion 47 does not contact the second conic portion 42 of the housing 10 (i.e. the adapter 16 and the housing are detached from each other) and a second configuration in which the second deformable portion 47 contact the second conic portion 42 of the housing 10 (i.e. the adapter 16 and the housing are attached to each other). The opening angle β of the second deformable portion 47 in the second configuration is greater than the opening angle α in the first configuration. The deformation of the second deformable portion 47 of the adapter 16 when receiving the housing 10 provides an optimal sealing between housing and adapter 16, permitting to collect spills of lubricant from the housing 10 in the adapter 16.

The piston 15 is made of a plastic material and comprises a circumferential surface 50 having a first deformable circumferential lip 51 extending towards the first end 11 of the housing 10 and a second deformable circumferential lip 52 extending towards the second end 12 of the housing 10. The deformable circumferential lip 51, 52 are positioned on opposite longitudinal sides of the piston 15.

The first and the second circumferential lips 51, 52 are deformable when contacting the inner wall of the first cylindrical portion 41 of the housing 10, for providing a convenient sealing between the piston 15 and the housing 10.

In operation, lubricant enters the container 10 through the first end 11 and pushes the piston 15 towards the second end 12, up to when the piston 15 contacts the cap 13, i.e. the container 1 is full of lubricant. For permitting the sliding of the piston 15 the cap 13 comprises a vent hole 18, coaxial with the longitudinal axis Y of the housing 10. For permitting easy emptying operations of the container 10 the vent hole 18 comprising a guide 19 for an external tool (not shown). The tool is insertable and guidable in the guide 19 of the vent hole 18 for pushing the piston 15 from the second end 12 to the first end 11 of the housing 10, thus forcing the lubricant to exit the housing 10 through the first end 11. For this purpose a longitudinal cavity 61 is provided on the piston 15 for engaging with the external tool.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A container for collecting a lubricant, the container comprising a housing having a longitudinal axial extension between a first end connectable to a source of lubricant and a longitudinally opposite second end, a cap attached to the second end, a piston slidably movable inside the housing between the first end and the second end of the housing, wherein the cap is attached to the second end of the housing by a snap connection for blocking an axial translation between the cap and the housing, the cap and the housing having respectively a first flat surface and a second flat surface contacting each other for preventing rotation of the cap around a longitudinal axis of the housing wherein the cap has a polygonal border with a plurality of border walls, wherein the cap comprises a plurality of snap connections and a plurality of first flat surfaces, the polygonal border comprising a first plurality of border walls and a second plurality of border walls, the plurality of snap connections and the plurality of first flat surfaces being respectively provided on the first plurality of border walls and on the second plurality of border walls, and wherein the first plurality of border walls and the second plurality of border walls are interposed between one another, each border walls of the first plurality comprising a snap connection and being interposed between two border walls of the second plurality of border walls.

2. The container according to claim 1 wherein the cap comprises a vent hole, said vent hole comprising a guide for an external tool, the tool being insertable and guidable in the vent hole for pushing the piston from the second end to the first end of the housing.

3. The container according to claim 2, wherein the vent hole is coaxial with the longitudinal axis of the housing.

4. The container according to claim 1, wherein the housing comprises a first cylindrical portion where the piston slidably moves and a second conic portion interposed between the first cylindrical portion and the first end, and wherein the container further includes an adapter having a first rigid portion connectable between the first end of the housing and the source of lubricant, and a second deformable portion subject to contact the second conic portion of the housing for providing a sealing between the housing and the adapter.

5. The container according to claim 4, wherein the second deformable portion of the adapter is cylindrical in shape and is deformable between a first configuration in which the second deformable portion does not contact the second conic portion of the housing and a second configuration in which the second deformable portion contact the second conic portion of the housing, an opening angle of the second deformable portion being greater in said second configuration than in said first configuration.

6. The container according to claim 4, wherein the first rigid portion comprises an inner thread for connecting to the first end of the housing and an external thread for connecting to the source of lubricant.

7. The container according to claim 1, wherein the piston comprises a circumferential surface having a first deformable circumferential lip extending towards the first end of the housing and a second deformable circumferential lip extending towards the second end of the housing, the first and the second circumferential lips being deformable for providing a sealing between the piston and the housing.

* * * * *